Oct. 8, 1968　　　　H. JACOBY　　　　3,404,583
DRIVING ARRANGEMENTS FOR MULTIPLE-SPINDLE MACHINE TOOLS
Filed March 15, 1966　　　　2 Sheets-Sheet 1

Inventor:
HANS JACOBY
BY Michael J. Striker
his ATTORNEY

Oct. 8, 1968   H. JACOBY   3,404,583
DRIVING ARRANGEMENTS FOR MULTIPLE-SPINDLE MACHINE TOOLS
Filed March 15, 1966   2 Sheets-Sheet 2

Inventor:
HANS JACOBY
BY
Michael J. Striker
his ATTORNEY

United States Patent Office 3,404,583
Patented Oct. 8, 1968

3,404,583
DRIVING ARRANGEMENTS FOR MULTIPLE-SPINDLE MACHINE TOOLS
Hans Jacoby, Bielefeld, Germany, assignor to Werkzeugmaschinenfabrik Gildemeister & Comp. Akt.-Ges., Bielefeld, Germany
Filed Mar. 15, 1966, Ser. No. 534,450
Claims priority, application Germany, Apr. 1, 1965, W 38,879
8 Claims. (Cl. 74—665)

ABSTRACT OF THE DISCLOSURE

A driving arrangement for the work spindles of a multiple-spindle machine tool wherein each spindle carries two pinions and two clutches each adapted to couple one of the pinions to the respective spindle. One pinion of each spindle meshes with a first driver gear which is driven by a motor and is mounted on a main shaft which supports the spindle carrier. The other pinion of each spindle meshes with a driven gear which forms part of a gear train including a removable change gear.

---

The present invention relates to indexible multiple-spindle machine tools and, more particularly to an improved driving arrangement for the work spindles of such machine tools. Still more particularly, the invention relates to a driving arrangement which can rotate each work spindle at a plurality of different speeds.

It is already known to provide an indexible multiple-spindle machine tool with a driving arrangement wherein a main shaft which is coaxial with the indexible spindle carrier comprises two fixedly mounted driver gears each of which meshes with one of two pinions provided on each spindle. Each spindle carries two clutches which can connect it with the respective pinions so that a selected spindle may be driven by the one or the other driver gear on the main drive shaft. A serious drawback of such driving arrangements is that the ratio of the two speeds at which each of the spindles may be driven by the main shaft is fixed, i.e., if the main shaft is rotated at a constant speed, each spindle can be driven only at two preselected speeds. This reduces the versatility of the machine tool.

Accordingly, it is an important object of the present invention to provide an indexible multiple-spindle machine tool with a driving arrangement which is capable of rotating each work spindle at any desired number of different speeds regardless of whether the main drive shaft of the machine tool is driven at a constant speed or at a variable speed.

Another object of the invention is to provide a novel gear train which may be utilized in a driving arrangement of the just outlined characteristics.

A further object of the invention is to provide an automatic programming system for operating the clutches on the individual work spindles in accordance with a predetermined and readily variable schedule.

An additional object of the instant invention is to provide a driving arrangement which comprises a relatively small number of simple parts whose components may be readily exchanged without necessitating even partial dismantling of the machine tool, and which enables an operator to select the speed or speeds of work spindles with little loss in time.

A concomitant object of the invention is to provide a driving arrangement which, though capable of rotating each of a plurality of work spindles at several different speeds, requires a single prime mover.

Briefly stated, one feature of my present invention resides in the provision of an indexible multiple-spindle machine tool which comprises a frame, a rotary carrier indexible in the frame, a plurality of work spindles supported by and disposed in a circle about the axis of the carrier, a main drive shaft coaxially received in the carrier, a first driver gear fixed to the shaft, first pinions rotatably mounted on the spindles and meshing with the first driver gear, a gear train including a second driver gear removably fixed to the main drive shaft and a driven gear which receives motion from the second driver gear and is coaxial with the main drive shaft, second pinions rotatably mounted on the spindles and meshing with the driven gear, and clutches for selectively coupling the pinions with the respective spindles so that each spindle may be driven by the first driver gear or by the driven gear, i.e., by the gear train.

The second driver gear is readily accessible and is preferably detachably affixed to the rear end portion of the main drive shaft which extends beyond the carrier, and this second driver gear preferably forms part of a change gear the other component of which may form part of a compound gear including an intermediate shaft mounted in the frame in parallelism with the main drive shaft. The gear train may further comprise a toothed sleeve which receives motion from the compound gear and is coaxial with the main drive shaft. The driven gear is affixed to and is thus driven by the toothed sleeve.

It will be seen that, by the simple expedient of providing the driving arrangement with a gear train which includes a readily removable change gear, the improved driving arrangement can rotate the work spindles at any desired speed despite the fact that a single prime mover suffices to rotate the main drive shaft at one or more speeds. By changing the speed of the main drive shaft, the operator can change the speed of the two driver gears but the ratio between the two speeds at which the work spindles may be driven will remain the same. Such ratio is changed by changing the ratio of the gear train.

The novel features which are considered as characteristic of the invention are set forth in particular in the appended claims. The improved driving arrangement itself, however, both as to its construction and its mode of operation, together with additional features and advantages thereof, will be best understood upon perusal of the following detailed description of a specific embodiment with reference to the accompanying drawings, in which:

Figure 1:
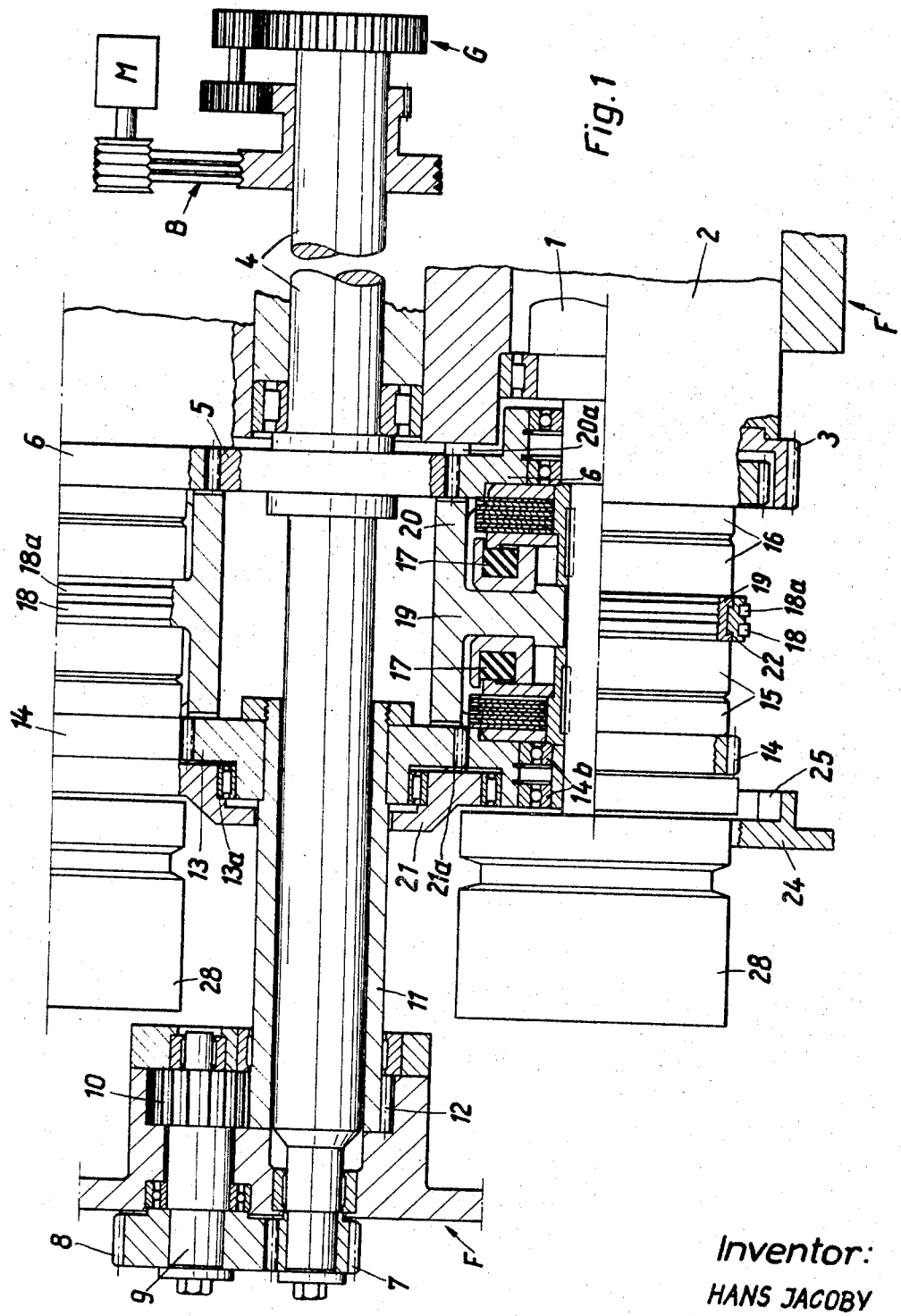
FIG. 1 is a fragmentary partly elevational and partly sectional view of an indexible multiple-spindle machine tool which embodies the improved driving arrangement.

Referring first to FIG. 1, there is shown a portion of an indexible multiple-spindle machine comprising a stationary frame F which supports a rotary indexible carrier 2 for a set of six equidistant work spindles 1 disposed in a circle about the carrier axis. The carrier 2 is provided with an indexing ring gear 3 constituting one component of a suitable indexing mechanism whose construction forms no part of the present invention. The driving arrangement for the spindles 1 comprises a main drive shaft 4 which is coxial with and extends through the carrier 2. The right-hand or front end portion of the main drive shaft 4 is connected with a variable-speed electric motor M or another suitable prime mover through a belt transmission B and a set of change gears G. The left-hand or rear end portion of the main drive shaft 4 extends beyond the carrier 2 and supports two driver gears 5 and 7. The driver gear 5 is in permanent mesh with six gears 6 (hereinafter called pinions) which are rotatable on the respective spindles 1 and can be coupled to such spindles by means of electromagnetic clutches 16. The other driver gear 7 forms part of a compound gear 7, 8 which, in turn, forms part of a gear train having a driven gear 13 which is coaxial with the main drive shaft 4 and meshes with six gears 14 (hereinafter called pinions) each of which is rotatable on the respective spindle 1. Electromagnetic clutches 15 serve to couple the pinions 14 to the respective spindles in a manner to be fully described hereinafter. The gear 8 which meshes with the driver gear 7 forms part of a compound gear including an intermediate shaft 9 which is parallel with the main drive shaft 4 and is rotatably journalled in the frame F. The intermediate shaft 9 carries a second gear 10 which meshes with a gear-shaped toothed portion 12 of an elongated sleeve 11 journalled in the frame F so as to surround a portion of the main drive shaft 4 and rigidly connected with the driven gear 13. Thus, and when a selected spindle 1 is to be driven by the motor M via gear train 7–13, the power flow is through the transmission B, change gear G, shaft 4, meshing change gears 7, 8, meshing gears 10, 12, sleeve 11, driven gear 13, the respective pinion 14 and the corresponding clutch 15. The rotational speed imparted to a given spindle 1 by the gear train 7–13 is different from that which can be imparted by the driver gear 5. Thus, and without making any changes, the operator can drive the spindles 1 at two different speeds whose ratio remains unchanged as long as the change gears 7, 8 remain mounted in a manner as shown in FIG. 1. If the operator desires to change the ratio of the two speeds, the gear 7, 8 are simply removed from the shafts 4 and 9 tobe replaced by a different set of change gears. In this way, each of the spindles 1 may be driven at any desired number of different speeds by resorting to a single prime mover and without necessitating replacement of the driver gear 5, driven gear 13, sleeve 11, gear 10, shaft 9 and pinions 6, 14. The change gears 7, 8 are readily accessible at the rear end of the main drive shaft 4 so that their replacement does not necessitate even partial dismantling of the remaining parts of the driving arrangement. When the machine tool is in actual use, the gears 7, 8 are preferably concealed behind a suitable shield which is not shown in the drawings.

The magnets 17 of the clutches 15, 16 on each spindle 1 are conductively connected with two circumferentially complete collector rings, 18, 18a supported by an annular insulator 22 inserted into a disk-shaped holder 19. The rings 18, 18a surround the set of six spindles 1 and the holder 19 is formed with six cutouts 19a (see FIG. 2) for the spindles. The radially inner portion of the holder 19 comprises a cylindrical flange 20 which is bolted or otherwise rigidly connected with the spindle carrier 2. The bolts 20a which connect the flange 20 to the carrier 2 pass through spaces between the driver gear 5 and pinions 6.

The flange 20 supports an annular bearing member 21 so that the latter is indirectly connected to and is indexible with the carrier 2. This bearing member 21 serves to support portions of the spindles 1, bearings 14b for the hubs 14a of the pinions 14, and an antifriction bearing 13a for the driven gear 13. The bolts 21a which connect the bearing member 21 to the flange 20 extend through gaps between the driven gear 13 and pinions 14.

Figure 3:
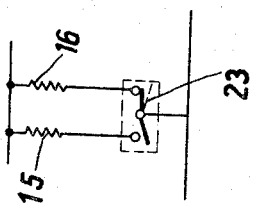
FIG. 3 is a schematic diagram showing the electric circuit of two clutches which are mounted on a work spindle.

In accordance with a feature of the present invention, both clutches 15, 16 on each of the spindles 1 are energizable by a common energizing member 23 which resembles a double-throw switch and can assume three different positions, namely, a first operative position in which it completes the circuit of the corresponding clutch 15, a second operative position in which it completes the circuit of the corresponding clutch 16, and a neutral or zero position in which the corresponding spindle 1 is uncoupled from both pinions 6, 14. FIG. 3 illustrates schematically the electric circuit of two clutches 15, 16 and the manner in which the corresponding energizing member 23 may be moved to three different positions. In the solid-line position of FIG. 3, the member 23 completes the circuit of the clutch 16.

Figure 2:
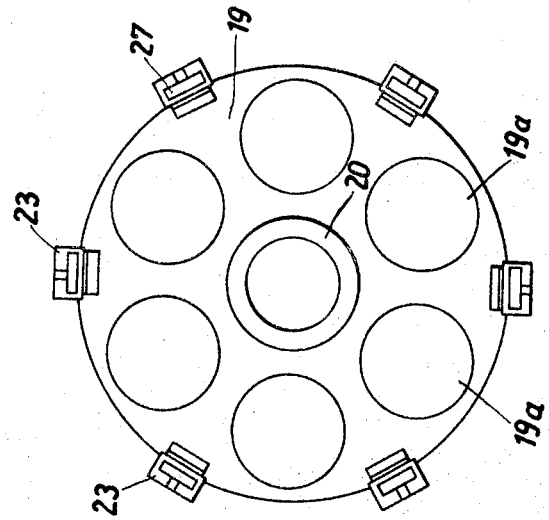
FIG. 2 is an end elevational view of an indexible holder for the energizing members which can effect energization of selected clutches.
Figure 4:
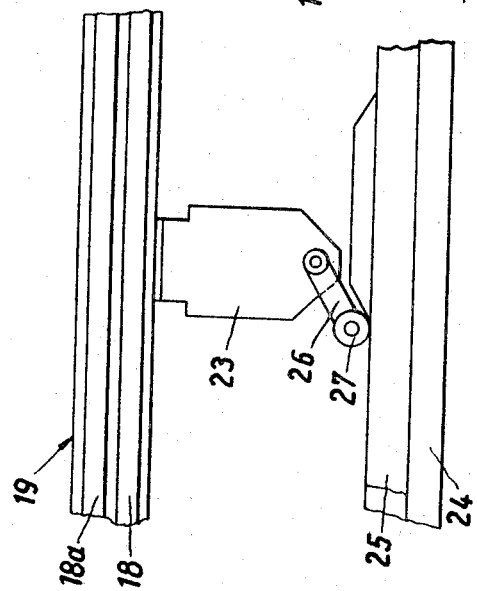
FIG. 4 is an enlarged developed fragmentary view as seen in the direction of the arrow IV in FIG. 1 and illustrates the manner in which an energizing member for the clutches of a given spindle cooperates with a cam-shaped actuating member.

The energizing members 23 are indexible with the carrier 2 and are operated by actuating members in the form of cams 25 which are removably and adjustably bolted or otherwise secured to a fixed ring-shaped support 24. As shown in FIG. 2, the energizing members 23 are mounted on the holder 19 outside of the circle defined by the spindles 1, i.e., outside of the cutouts 19a. FIG. 2 shows that the energizing members 23 are equidistant from each other and that each thereof is located midway between the axes of two adjoining spindles. Each energizing member 23 comprises a rockable arm or lever 26 (see FIG. 4) which carries a roller follower 27 arranged to track the actuating members 25 in response to indexing of the carrier 2. Depending on the presence or absence of actuating members 25, and depending on the exact configuration of such actuating members, each energizing member 23 can complete the circuit of the one or the other clutch 15, 16 (or will not energize any of the two clutches) when the carrier 2 is indexed to a new position to insure that the corresponding spindle 1 is not driven at all or that such spindle is driven at the speed determined by the driver gear 6 or 7.

By the simple expedient of changing the distribution of actuating members 25 and/or by properly selecting the change gear 7, 8, the operator can insure that, during each interval between consecutive indexing movements of the carrier, the spindles 1 will be driven at any one of a large number of different speeds to thus enhance the versatility of the machine tool. The provision of a relatively long toothed spindle 11 enables the designer to place the two clutches 15, 16 on each spindle 1 sufficiently close to each other so that they may be energized (one at a time) by a common energizing member 23. In other words, the sleeve 11 enables the designer to place the pinions 14 close to the pinions 6.

The working stations are adjacent to the right-hand side of the carrier 2 as the parts appear in FIG. 1. Each work spindle 1 carries a suitable chuck, not shown, which may be opened or closed by a fluid-operated cylinder and piston unit 28.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a machine of the character indicated, a frame; a rotary carrier indexible in said frame; a plurality of work spindles rotatably supported by and disposed in a circle about the axis of said carrier; a main drive shaft coaxially received in said carrier; a first driver gear fixed to said shaft; first pinions rotatably mounted on said spindles and meshing with said driver gear; a gear train including a second driver gear fixed to said shaft and a driven gear; second pinions rotatably mounted on said spindles and meshing with said driven gear; electromagnetic clutches mounted on said spindles for selectively coupling said pinions with the respective spindles; a common energizing member for the clutches of each spindle, said energizing members being adjacent to said circle and being indexible with said carrier; and stationary actuating members for said energizing members.

2. A structure as set forth in claim 1, wherein said main drive shaft comprises a front end portion at one side and a rear end portion at the other side of said carrier, said second driver gear being detachably fixed to the rear end portion of said shaft.

3. A structure as set forth in claim 2, further comprising a single prime mover drivingly connected with the front end portion of said shaft.

4. A structure as set forth in claim 1, wherein said gear train further comprises a toothed sleeve coaxially surrounding said main drive shaft and receiving motion from said second driver gear, said driven gear being fixed to said sleeve.

5. A structure as set forth in claim 4, wherein said gear train further comprises a compound gear meshing with said second driver gear and with said toothed sleeve.

6. A structure as set forth in claim 1, further comprising a stationary support adjustably supporting said actuating member adjacent to the path of movement of said energizing members.

7. A structure as set forth in claim 6, further comprising a holder for said energizing members and means securing said holder to said carrier.

8. A structure as set forth in claim 1, wherein said driven gear is located between said driver gears and is coaxial with said main drive shaft.

References Cited

UNITED STATES PATENTS

| | | | |
|---|---|---|---|
| 1,177,827 | 4/1916 | Spencer | 29—37 |
| 1,311,314 | 7/1919 | Brown | 29—37 |
| 2,083,312 | 6/1937 | Brown et al. | 29—37 |
| 2,816,454 | 12/1957 | Hosea et al. | 192—84 X |

FRED C. MATTERN, JR., *Primary Examiner.*

THOMAS C. PERRY, *Assistant Examiner.*